United States Patent
Vennettilli et al.

(10) Patent No.: US 8,001,834 B2
(45) Date of Patent: Aug. 23, 2011

(54) METHOD FOR DETECTING FAULTS IN THE AIR SYSTEM OF INTERNAL COMBUSTION ENGINES

(75) Inventors: Nando Vennettilli, Turin (IT); Massimiliano Maira, Turin (IT); Morena Bruno, Chivasso (IT)

(73) Assignee: GM Global Technology Operations LLC, Detroit, MI (US)

( * ) Notice: Subject to any disclaimer, the term of this patent is extended or adjusted under 35 U.S.C. 154(b) by 231 days.

(21) Appl. No.: 12/492,322

(22) Filed: Jun. 26, 2009

(65) Prior Publication Data

US 2009/0320577 A1 Dec. 31, 2009

(30) Foreign Application Priority Data

Jun. 27, 2008 (GB) .................................. 0811772.3

(51) Int. Cl.
*G01M 15/10* (2006.01)
(52) U.S. Cl. ................................ 73/114.32; 73/114.73
(58) Field of Classification Search ............... 73/114.31, 73/114.32, 114.33, 114.34, 114.69, 114.71, 73/114.73
See application file for complete search history.

(56) References Cited

U.S. PATENT DOCUMENTS

| | | | |
|---|---|---|---|
| 5,927,260 A * | 7/1999 | Kishimoto et al. ........... 123/688 |
| 6,253,541 B1 | 7/2001 | Sullivan et al. | |
| 7,117,078 B1 | 10/2006 | Gangopadhyay | |
| 2010/0005872 A1 * | 1/2010 | Vennettilli et al. ......... 73/114.73 |

FOREIGN PATENT DOCUMENTS

| | | |
|---|---|---|
| JP | 2001182574 A | 7/2001 |
| JP | 2003293821 A | 10/2003 |
| JP | 2006291871 A | 10/2006 |
| JP | 2006316706 A | 11/2006 |
| WO | 2006019549 A2 | 2/2006 |

* cited by examiner

*Primary Examiner* — Eric S McCall
(74) *Attorney, Agent, or Firm* — Ingrassia Fisher & Lorenz, P.C.

(57) ABSTRACT

A method for detecting faults in an air system of an internal combustion engine having an intake manifold and an exhaust manifold includes, but is not limited to the steps of measuring an oxygen concentration of the gas flowing in the exhaust manifold, estimating an intake oxygen control value in the intake manifold and estimating an intake oxygen reference value in the intake manifold based on said oxygen concentration of the gas flowing in the exhaust manifold. The method further includes, but is not limited to the steps of calculating an intake deviation value as a difference between the intake oxygen control value and the intake oxygen reference value and verifying if the intake deviation value is greater than a predetermined first threshold.

4 Claims, 2 Drawing Sheets

METHOD FOR DETECTING FAULTS IN THE AIR SYSTEM OF INTERNAL COMBUSTION ENGINES

CROSS-REFERENCE TO RELATED APPLICATION

This application claims priority to British Patent Application No. 0811772.3, filed Jun. 27, 2008, which is incorporated herein by reference in its entirety.

TECHNICAL FIELD

The present invention relates to fault detection in an air system of an internal combustion engine.

BACKGROUND

The combustion process in an internal combustion engine produces $NO_X$ (principally NO and $NO_2$), CO, $CO_2$, HC (HydroCarbons), and PM (Particulate Matter). The amount of $CO_2$ depends on the amount of fuel injected into the cylinders and the amount of CO and HC depends on the combustion efficiency of the internal combustion engine. The amount of $NO_X$ depends on the combustion temperature and on the amount of oxygen introduced into the cylinders, while the amount of PM is strictly dependent on the air to fuel ratio ($\lambda$).

To optimize the amount of PM and $NO_X$ produced, combustion engines are provided with an EGR (Exhaust Gas Recirculation) circuit. The EGR system recirculates exhaust gas from the exhaust manifold to the intake manifold in order to dilute the fresh air introduced into the engine. This leads to emission optimization during the combustion process, because higher amount of $H_2O$ and $CO_2$ are introduced, which have a high heat capacity that reduces the combustion temperature. Another effect of diluting the intake flow is that it is possible to control the amount of $O_2$ in the intake flow. The counter effect of this system is that the more the fresh air is diluted, the more the air to fuel ratio ($\lambda$) is reduced. This leads to higher amount of PM emissions. The quantity of exhaust gas flowing into the cylinders is controlled by an EGR valve.

In conventional internal combustion engines there are also an air mass sensor (or air flow meter), an air pressure sensor, an air temperature sensor and an oxygen sensor at the intake manifold. The air mass sensor is adapted to measure the fresh air flow entering the intake manifold through a throttle valve. The air pressure and temperature sensors are adapted to measure the pressure and the temperature of the gas entering into the cylinders, respectively. They are placed in the intake manifold downstream the mixing point between the fresh air flow and the recirculated gas flow.

In conventional engines there is an electronic control unit (ECU) arranged to estimate the gas flow entering into the cylinders and to control the exhaust gas recirculation in the intake manifold. In order to detect a failure in the engine operation, the ECU performs a deviation error monitoring by calculating the difference between a requested (or setpoint) value for a given entity and a corresponding measured value taken from a sensor, so as to detect a deviation of the air system behavior due to failures inside it.

It has been demonstrated that the emissions can be limited by the introduction of the oxygen concentration monitoring in the control of the exhaust gas recirculation in the intake manifold. However, oxygen sensors adapted to measure an actual oxygen quantity in the intake manifold are expensive and do not provide data quickly, this resulting in a delay in obtaining an indication of the deviation of the actual oxygen quantity from a predetermined oxygen setpoint.

In view of the above, it is at least one object of the present invention to provide an improved method for detecting faults in the air system which takes into account the oxygen concentration in the intake manifold without using data directly provided by an oxygen sensor. In addition, it other objects, desirable features and characteristics, will become apparent from the subsequent summary and detailed description, and the appended claims, taken in conjunction with the accompanying drawings and this background.

This and other objects are achieved according to the present invention by a method for detecting faults in an air system of an internal combustion engine having an intake manifold and an exhaust manifold. The method comprising the steps of measuring an oxygen concentration ([O2] em_UEGO) of a gas flowing in the exhaust manifold; a) estimating an intake oxygen control value ([O2]im_control) in the intake manifold, estimating an intake oxygen reference value ([O2]im_ECU) in the intake manifold based on the oxygen concentration ([O2]em_UEGO) of the gas flowing in the exhaust manifold, calculating an intake deviation value ([O2]im_dev) as a difference between the intake oxygen control value ([O2]im_control) and the intake oxygen reference value ([O2]im_ECU), and comparing if the intake deviation value ([O2]im_dev) with a predetermined first threshold (TH1). The method further comprising the steps of b) estimating an exhaust oxygen control value ([O2]em_control) in the exhaust manifold, calculating an exhaust deviation value ([O2]em_dev) as a difference between the exhaust oxygen control value ([O2]em_control) and the oxygen concentration ([O2]em_UEGO) of the gas flowing in the exhaust manifold; and comparing said exhaust deviation value ([O2]em_dev) with a predetermined second threshold (TH2). The method also including the steps of c) determining an exhaust oxygen concentration setpoint ([O2]spEM) indicative of the oxygen concentration in the exhaust manifold, calculating a fresh airflow setpoint (Airreference) as a function of the exhaust oxygen concentration setpoint ([O2]spEM), measuring (400) a fresh air mass flow value (mMAF), calculating (1400) an airflow deviation (Airflowdev) as difference between said fresh airflow setpoint (Airreference) and the fresh air mass flow value (mMAF), and comparing said airflow deviation (Airflowdev) with a third predetermined threshold (TH3) and a fourth predetermined threshold (TH4), and finally detecting faults in the air system as a function of the combination of results of comparisons at step a), b) and/or c).

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Briefly, the method according to an embodiment of the invention is based on the use of a double check to monitor the oxygen concentration estimation deviation; a first check is made on the oxygen concentration value in the intake manifold, the other one is based on the oxygen concentration value in the exhaust manifold.

Figure 1:
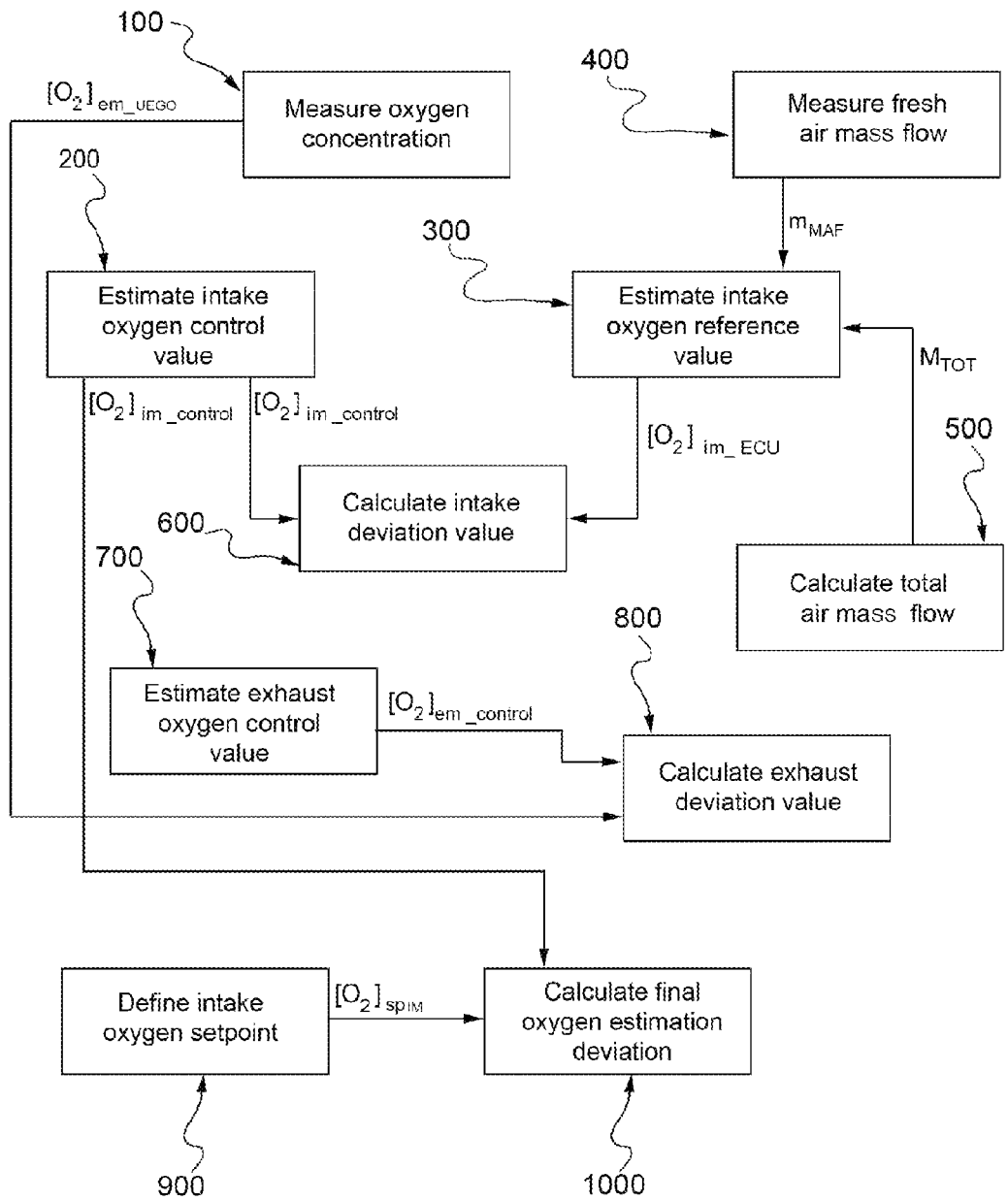
FIG. 1 is a flow chart of the operations to be performed to detect faults in the air system according to an embodiment of the present invention.

FIG. 1 shows a flow chart of the operations to be performed to detect faults in the air system according to the embodiment of the method of the invention. The method comprises a first step 100 of measuring the oxygen concentration in the exhaust gas flow through a Universal Exhaust Gas Oxygen (UEGO) sensor placed in the exhaust line of the engine. The UEGO sensor is arranged to provide an analogue output $[O_2]_{em\_UEGO}$ which is proportional to the oxygen percentage in the exhaust gas.

An electronic control unit ECU of the engine estimates, in a step 200, an intake oxygen control value $[O_2]_{im\_control}$ in the intake manifold, for example as disclosed in U.S. Pat. No. 7,117,078, which is hereby incorporated in its entirety by reference.

In a step 300 the ECU estimates an intake oxygen reference value $[O_2]_{im\_ECU}$ in the intake manifold according:

$$[O_2]_{im\_UEGO} = 0.233\left(1 - \frac{m_{TOT} - m_{MAF}}{m_{TOT}} \frac{1}{\lambda}\right) \quad (1)$$

Where $m_{MAF}$ is a fresh air mass flow value measured, in a step 400, by an air mass sensor adapted to measure the fresh air flow entering the intake manifold through a throttle valve, $\lambda$ is the air to fuel ratio calculated by the ECU, based on the oxygen concentration $[O_2]_{em\_UEGO}$ measured by the said UEGO sensor, and $m_{TOT}$ is the total air mass flow in the intake manifold, calculated in a step 500 according to the following equation:

$$m_{TOT} = \eta V \frac{P}{RT} \quad (2)$$

Where V is the volume of the cylinder, P is the pressure in the intake manifold measured by the pressure sensor, T is the temperature in the intake manifold measured by the temperature sensor and $\eta$ is the estimated volumetric efficiency.

In a step 600 the ECU calculates an intake deviation value $[O_2]_{im\_dev}$ according to the following equation:

$$[O_2]_{im\_dev} = |[O_2]_{im\_control} - [O_2]_{im\_ECU}| \quad (3)$$

and verifies if said deviation value $[O_2]_{im\_dev}$ is greater than a first predetermined threshold TH1.

According to the subject matter disclosed in U.S. Pat. No. 7,117,078 and the above disclosed equation 1, the intake manifold pressure sensor, the intake manifold temperature sensor and the air mass sensor are used for both estimating the intake oxygen control value $[O_2]_{im\_control}$ and the intake oxygen reference value $[O_2]_{im\_ECU}$ in the intake manifold.

The failure modes that can affect the common inputs (e.g., drift of the sensors involved in the estimation, measurement of the sensors fixed to a plausible value, etc. . . . ) cannot be therefore detected by this check.

The above calculation of the intake deviation value $[O_2]_{im\_dev}$ is therefore designed so as to detect all the fault types of the air system that can produce a deviation in the intake oxygen concentration estimation, but it is unable to isolate a single fault since there are many faults that can affect such a deviation.

For this reason, the ECU further estimates in a step 700 an exhaust oxygen control value $[O_2]_{em\_control}$ in the exhaust manifold, for example as disclosed in U.S. Pat. No. 7,117,078. In a step 800 the ECU calculates an exhaust deviation value $[O_2]_{em\_dev}$ according to the following equation:

$$[O_2]_{em\_dev} = |[O_2]_{em\_control} - [O_2]_{em\_UEGO}| \quad (4)$$

and verifies if said deviation value $[O_2]_{em\_dev}$ is greater than a second predetermined threshold TH2. Where $[O_2]_{em\_UEGO}$ is the oxygen concentration in the exhaust manifold measured by the UEGO sensor.

According to the subject matter disclosed in U.S. Pat. No. 7,117,078, the intake manifold pressure sensor, the intake manifold temperature sensor and the air mass sensor are used for both estimating the exhaust oxygen control value $[O_2]_{em\_control}$ in the exhaust manifold and the intake oxygen control value $[O_2]_{im\_control}$ in the intake manifold.

With this double check, it is possible to separate the fault causes in two different groups.

If a fault is detected by the second check but it is not detected by the first one, than it could be due to a failure in one of the sensors that has been used as input for both estimating the intake oxygen control value $[O_2]_{im\_control}$ and the intake oxygen reference value $[O_2]_{im\_ECU}$ in the intake manifold. Actually, the same sensors are used for estimating the intake oxygen control value $[O_2]_{im\_control}$, the exhaust oxygen control value $[O_2]_{em\_control}$ and the intake oxygen reference value $[O_2]_{im\_ECU}$, while the oxygen concentration in the exhaust manifold $[O_2]_{em\_UEGO}$ is measured by the UEGO sensor.

If the second check shows a deviation, it means that there is a fault in one of the sensors used for estimating the exhaust oxygen control value $[O_2]_{em\_control}$ because the other term of comparison, that is the oxygen concentration in the exhaust manifold $[O_2]_{em\_UEGO}$, is a measured value, and therefore not affected by sensors at the intake manifold.

If the first check does not show any deviation, it means that a fault in a sensor commonly used as input both for estimating the intake oxygen control value $[O_2]_{im\_control}$ and the intake oxygen reference value $[O_2]_{im\_ECU}$ affects both the two estimations, and this leads to not reveal any deviation.

Differently, if a fault is detected by both the two checks, than it could be due to a failure of one of the other sensors, actuators or components that belong to the air system.

The ECU defines in a step 900 a predetermined intake oxygen concentration setpoint $[O_2]_{spIM}$ and, in a step 1000, calculates a final oxygen estimation deviation in the intake manifold as a difference between said intake oxygen concentration setpoint $[O_2]_{spIM}$ and the intake oxygen control value $[O_2]_{im\_control}$ in the intake manifold estimated in step 200.

Figure 2:
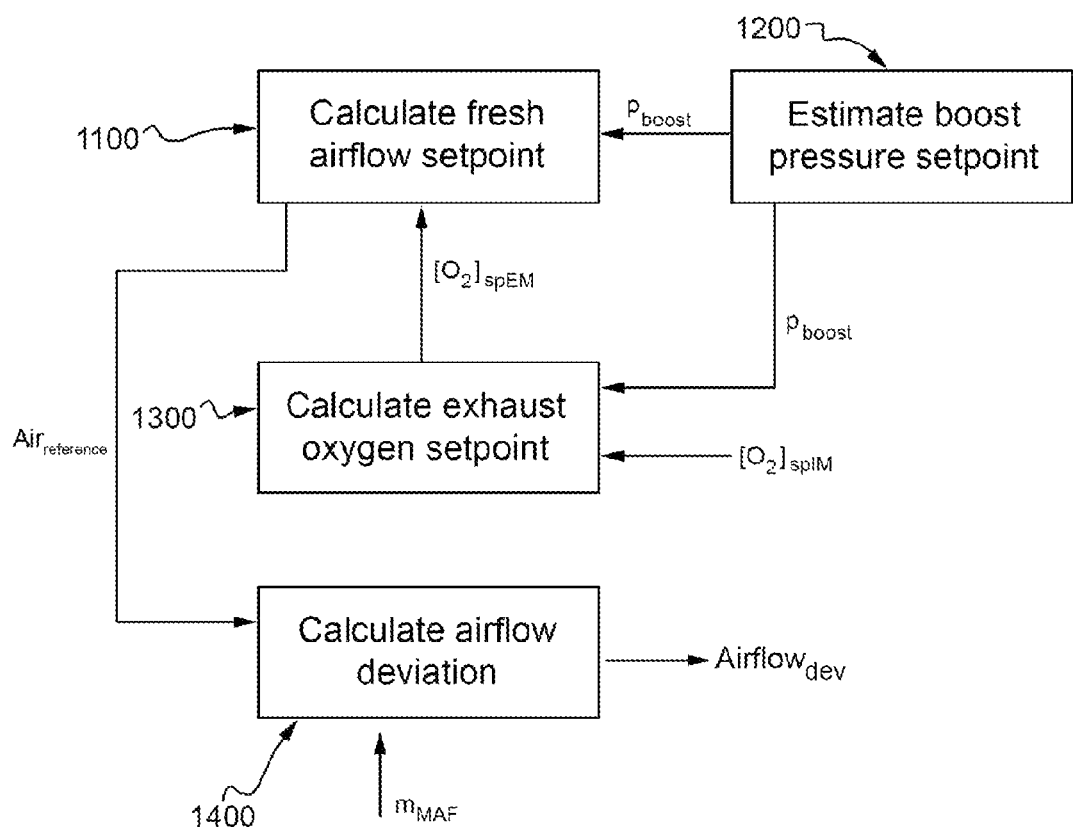
FIG. 2 is a flow chart of the operations to be performed to realize an airflow deviation error monitoring.

In order to isolate the faults that affect said final oxygen estimation deviation, the results of the previous two checks are compared with a third check based on a classical airflow deviation error monitoring, as here below disclosed with reference to FIG. 2.

A fresh airflow setpoint $Air_{reference}$ is calculated in a step 1100 through the following equation:

$$Air_{reference} = \frac{\frac{[O_2]_{spEM}}{[O_2]_{air}} M_{fuel} + C_{sr} M_{fuel\_Burnt}}{1 + \left[\frac{[O_2]_{spEM}}{[O_2]_{air}}\right]} \quad (5)$$

Where $M_{fuel}$ is the quantity of injected fuel, $M_{fuel\_Burnt}$ is the portion of the injected fuel quantity that takes part to the combustion process, $C_{sr}$ is the stoichiometric air to fuel ratio, $[O_2]_{spEM}$ is an exhaust oxygen concentration setpoint in the exhaust manifold, calculated by the control unit ECU as herein below disclosed, $[O_2]_{air}$ is the oxygen concentration in the fresh air (e.g. 20.95% in case of volumetric concentration).

The exhaust oxygen concentration setpoint $[O_2]_{spEM}$ is provided by the ECU according to the following two options: 1) it is determined as a function of the engine operating point (engine speed and load); 2) it is calculated in a step 1300 according to the following equation:

$$[O_2]_{spEM} = \frac{\left(\eta \frac{p_{boost} V_{eng} N_{eng}}{R_{im} T_{im} 120}\right)[O_2]_{spEM} - C_{sr} M_{fuel\_Burnt}[O_2]_{air}}{\left(\eta \frac{p_{boost} V_{eng} N_{eng}}{R_{im} T_{im} 120}\right) + M_{fuel}} \quad (6)$$

Where $\eta$ is the volumetric efficiency, $V_{eng}$ is the engine displacement, $N_{eng}$ is the engine rotational speed, $R_{im}$ is the ideal gas law constant, $T_{im}$ is an intake manifold temperature setpoint and $p_{boost}$ is a predetermined boost pressure setpoint.

Alternatively, the boost pressure setpoint $p_{boost}$ and the intake manifold temperature setpoint $T_{im}$ may be replaced with respective actual pressure and actual temperature measured by sensors placed in the intake manifold. Alternatively, other combinations of the above cited parameters may be possible.

Briefly summarizing, two options are therefore possible: 1) the exhaust oxygen concentration setpoint $[O_2]_{spEM}$ is determined within the control unit ECU and it is then used to calculate the air reference value $Air_{reference}$ through equation 5; 2) the intake oxygen concentration setpoint $[O_2]_{spIM}$ is determined within the control unit ECU and it is used to calculate a corresponding exhaust oxygen concentration setpoint through equation 6, so as to have a value that can be used in equation 5 to calculate the air reference value $Air_{reference}$.

The fresh airflow setpoint $Air_{reference}$ is compared with the measured fresh air mass flow $m_{MAF}$ in order to calculate, in a step 1400, an airflow deviation $Airflow_{dev}$, and to verify if said airflow deviation $Airflow_{dev}$ is comprised between a third threshold TH3 and a fourth threshold TH4, according to the following equations:

$$Airflow_{dev} = Air_{reference} - m_{MAF} > TH3 \quad (7)$$

$$Airflow_{dev} = Air_{reference} - m_{MAF} < TH4 \quad (8)$$

The airflow deviation $Airflow_{dev}$ is an error term representative of the difference between the desired fresh airflow and the actual one. In this case, the only sensor common to those used by the two previously described checks is the air mass sensor.

Based on the three checks above disclosed, it is possible to detect faults affecting the final oxygen concentration estimation in the intake manifold and furthermore, by means of a cross check, it is also possible to isolate the faults, as shown for example in Table 1.

|  | Check 1 | Check 2 | Check 3 |
|---|---|---|---|
| Sensor 1 | x | x | x |
| Sensor 2 |  | x | x |
| Sensor 3 |  | x | x |
| Sensor 4 |  | x | x |
| Sensor 5 |  |  | x |
| Sensor 6 |  |  | x |

The sensor 1 is used by check 1, check 2 and check 3. The sensor 2 is used by check 2 and check 3, but not by check 1. If check 2 and check 3 detect a fault, but check 1 does not detect any fault, it is possible to declare that the fault is not on sensor 1, but could be on sensor 2. Depending on the number of sensors common or not to the three checks, it is possible to reduce the number of sensors that can be subject to a fault and, in some cases, it is possible to recognize the sensor responsible of the fault of the whole system.

The present invention is applicable in both diesel and gasoline engines. Clearly, the principle of the invention remaining the same, the embodiments and the details of production can be varied considerably from what has been described and illustrated purely by way of non-limiting example, without departing from the scope of protection of the present invention as defined by the attached claims. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method for detecting faults in an air system of an internal combustion engine having an intake manifold and an exhaust manifold, the method comprising the steps of:
    measuring an oxygen concentration of a gas flowing in the exhaust manifold;
    estimating an intake oxygen control value in the intake manifold;
    estimating an intake oxygen reference value in the intake manifold based on the oxygen concentration of the gas flowing in the exhaust manifold;
    calculating an intake deviation value as a difference between the intake oxygen control value and the intake oxygen reference value;
    comparing the intake deviation value with a predetermined first threshold;
    estimating an exhaust oxygen control value in the exhaust manifold;
    calculating an exhaust deviation value as a second difference between the exhaust oxygen control value and the oxygen concentration of the gas flowing in the exhaust manifold;
    comparing said exhaust deviation value with a predetermined second threshold;
    determining an exhaust oxygen concentration setpoint that is indicative of the oxygen concentration in the exhaust manifold;
    calculating a fresh airflow setpoint as a function of said exhaust oxygen concentration setpoint;
    measuring a fresh air mass flow value;
    calculating an airflow deviation as a third difference between said fresh airflow setpoint and the fresh air mass flow value;
    comparing said airflow deviation with a third predetermined threshold and a fourth predetermined threshold; and
    detecting faults in the air system that is based at least in part on a combination of the steps of comparing the intake deviation value with the predetermined first threshold, comparing the exhaust deviation value with the predetermined second threshold, and comparing said airflow deviation with the third predetermined threshold and the fourth predetermined threshold.

2. The method according to claim 1, further comprising the steps of:
defining a predetermined intake oxygen concentration setpoint; and
calculating a final oxygen estimation deviation in the intake manifold as a fourth difference between the intake oxygen setpoint and the intake oxygen control value.

3. The method according to claim 1, wherein the step of estimating the intake oxygen reference value in the intake manifold is performed according:

$$[O_2]_{im\_ECU} = 0.233\left(1 - \frac{m_{TOT} - m_{MAF}}{m_{TOT}}\frac{1}{\lambda}\right)$$

where $\lambda$ is an air to fuel ratio, and $m_{TOT}$ is a total air mass flow in the intake manifold.

4. The method according to claim 1, wherein the step of estimating the intake oxygen reference value in the intake manifold is performed according to:

$$[O_2]_{im\_ECU} = 0.233\left(1 - \frac{\eta V \frac{P}{RT} - m_{MAF}}{\eta V \frac{P}{RT}}\frac{1}{\lambda}\right)$$

where $\lambda$ is an air to fuel ratio, V is a volume of a cylinder of the internal combustion engine, P is a pressure in the intake manifold, T is a temperature in the intake manifold, and $\eta$ is a volumetric efficiency.

* * * * *